(12) United States Patent
Lizotte et al.

(10) Patent No.: US 11,606,448 B2
(45) Date of Patent: *Mar. 14, 2023

(54) EFFICIENT CAPTURE AND STREAMING OF DATA PACKETS

(71) Applicant: Accedian Networks Inc., Saint-Laurent (CA)

(72) Inventors: Sylvain Lizotte, Montreal (CA); Marc-André Lamontagne, Pointe-Claire (CA); Marc Gélinas, Laval (CA); Yanick Viens, St-Jean-sur-Richelieu (CA)

(73) Assignee: Accedian Networks Inc., Saint-Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/548,850

(22) Filed: Dec. 13, 2021

(65) Prior Publication Data

US 2022/0103659 A1    Mar. 31, 2022

Related U.S. Application Data

(63) Continuation of application No. 16/731,832, filed on Dec. 31, 2019, now Pat. No. 11,233,885, which is a continuation of application No. 15/255,989, filed on Sep. 2, 2016, now Pat. No. 10,616,382.

(51) Int. Cl.
| | |
|---|---|
| *H04L 69/22* | (2022.01) |
| *H04L 43/028* | (2022.01) |
| *H04L 43/04* | (2022.01) |
| *H04L 43/022* | (2022.01) |
| *H04L 47/36* | (2022.01) |

(52) U.S. Cl.
CPC ............ *H04L 69/22* (2013.01); *H04L 43/022* (2013.01); *H04L 43/028* (2013.01); *H04L 43/04* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 10,038,603 B1* | 7/2018 | Darche | H04L 43/12 |
| 10,616,382 B2* | 4/2020 | Lizotte | H04L 69/22 |
| 11,233,885 B2* | 1/2022 | Lizotte | H04L 43/022 |
| 2008/0256081 A1* | 10/2008 | Bui | H04L 41/5064 |
| 2009/0217369 A1* | 8/2009 | Abeni | H04L 47/10 726/13 |
| 2012/0158737 A1* | 6/2012 | Levy | H04L 43/18 707/E17.014 |
| 2015/0124622 A1* | 5/2015 | Kovvali | H04W 24/08 370/236 |

* cited by examiner

*Primary Examiner* — Xavier S Wong
(74) *Attorney, Agent, or Firm* — Stratford Group Ltd.

(57) ABSTRACT

What is disclosed is a method for efficient capture and streaming of data packets in a network device comprises capturing data packets matching predetermined filters, packaging said data packets into samples, and aggregating one or more samples in a high speed bus payload. The method also comprises transferring said high speed bus payload to a CPU, extracting said samples from the high speed bus payload and storing said samples in a shared memory of the CPU, and accessing said samples from the shared memory for streaming to one or more client.

8 Claims, 2 Drawing Sheets

EFFICIENT CAPTURE AND STREAMING OF DATA PACKETS

CROSS-REFERENCE TO RELATED APPLICATIONS

This application is a continuation of and claims priority to U.S. patent application Ser. No. 16/731,832, filed on Dec. 31, 2019, now allowed, which is a continuation of and claims priority to U.S. patent application Ser. No. 15/255,989, filed Sep. 2, 2016, now U.S. Pat. No. 10,616,382, which are hereby incorporated by reference herein in their entirety.

FIELD OF THE INVENTION

The present disclosure relates to networking and more specifically to efficient capturing and streaming of data packets.

BRIEF SUMMARY

A method for efficient capture and streaming of data packets in a network device comprises capturing data packets matching predetermined filters, packaging said data packets into samples, and aggregating one or more samples in a high speed bus payload. The method also comprises transferring said high speed bus payload to a CPU, extracting said samples from the high speed bus payload and storing said samples in a shared memory of the CPU, and accessing said samples from the shared memory for streaming to one or more client.

A network device comprises an input port configured to receive packets from a network, an output port configured to deliver the packets to a target device connected thereto, and a flow server. The flow server is configured to analyze the packets to identify at least one target packet, capture a copy of the at least one target packet, create meta-data containing information related to the at least one target packet, and create a sample comprising the meta-data and the copy of the at least one target packet. The network device also comprises a flow client coupled to the flow server and configured to receive the sample from the flow server and store the sample in a database.

A non-transitory computer readable storage medium comprises instructions, which when executed by a processor, cause the processor to capture one or more data packets of a packet flow matching predetermined filters, package the one or more data packets into a sample, and aggregate one or more samples in a high speed bus payload. The instructions also cause the processor to transfer said high speed bus payload to a CPU, extract the one or more samples from the high speed bus payload, store the one or more samples in a shared memory of the CPU, and access the one or more samples from the shared memory for streaming to one or more client.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
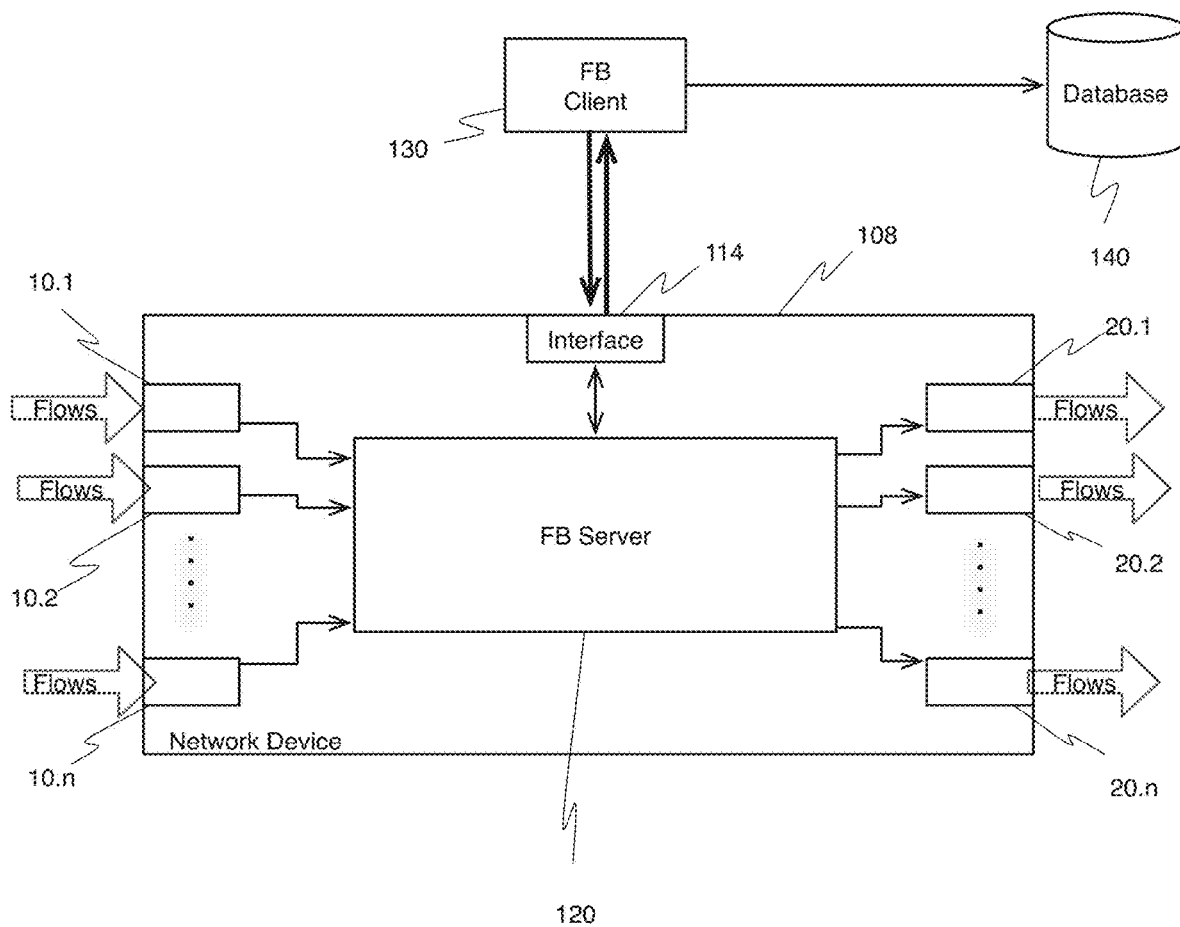
FIG. 1 is a diagram of a networking device comprising a flow server

While the present disclosure is susceptible to various modifications and alternative forms, specific embodiments or implementations have been shown by way of example in the drawings and will be described in detail herein. It should be understood, however, that the disclosure is not intended to be limited to the particular form disclosed. Rather, the disclosure is to cover all modifications, equivalents, and alternatives falling within the spirit and scope of an invention as defined by the appended claims.

DETAILED DESCRIPTION

Capturing and streaming data packets is a function commonly used in network devices for testing or monitoring purpose. The packets matching a predefined flow filter are captured and streamed as samples to another entity for processing. The capturing and streaming function increases the network device CPU usage and the network bandwidth. This additional load is particularly emphasized as the traffic rate increases. In order to maximize the amount of samples that can be streamed while minimizing the CPU usage and the required bandwidth, the capture and stream mechanisms must be optimal.

The capturing and the streaming of the samples are two distinct operations. The capturing of the packets is the mechanism that gets data from a processing engine and stores that data in memory. The streaming of the samples is the mechanism that takes the data from the memory and streams it to a remote entity.

Referring to FIG. 1, a networking device 108 comprises input ports 10.1, 10.2 . . . 10.*n* to receive flows of packets from the network and one or more relevant output port(s) 20.1, 20.2 . . . 20.*n* connectable to downstream target devices (not shown) for delivery of the network packets thereto. A server referred herein as a flow server 120 processes and analyzes the packets as they are received. As explained below, samples of data containing copies of the packets may be created by the flow server 120. Another interface 114 on the device 108 corresponds to the local IP interface used by the flow server 120 to report the samples to a client, referred herein as a flow client 130. The interface 114 could be any IP interface associated with a physical port. The interface 114 could also be a traffic port for in-band management, for instance. The input and output ports are physically the same traffic port, i.e. input port 1 (10.1) and output port 1 (20.1) are on the same physical port 1 (not shown). They are illustrated separately only to highlight the difference between the ingress (incoming) traffic flows and the egress (outgoing) traffic flows.

The flow server mechanism 120 analyzes the packets from the ingress traffic flows using filtering rules and captures copies of the packets if they match certain criteria. For each captured packet, the flow server mechanism 120 also creates and reports meta-data, such as, but not limited to, the length of the packet, the length of the sample, the incoming port identification (e.g., port 10.1), flow identification, and a timestamp marking the packet's time of arrival to the flow server 120. Along with the captured packet, these meta-data define a sample. The samples, along with other control messages, are sent to the flow client 130 in a TCP stream. TCP is used to ensure reliability and to make sure the samples are received in the order in which they were captured and streamed. The flow client 130 stores samples and results of analysis to a database 140. The functions of the flow client 130 can be performed by an application on a processor or by a third party software.

The flow server mechanism 120 can generate large amounts of data to the flow client 130, which increases the management bandwidth required by the flow server 120. The increase of management bandwidth (i.e., in-band management) can affect the throughput of the data from the input ports (10.1 . . . 10.*n*) to the output ports (20.1 . . . 20.*n*) due to the additional data processing of streaming the samples to the flow client 130.

Figure 2:
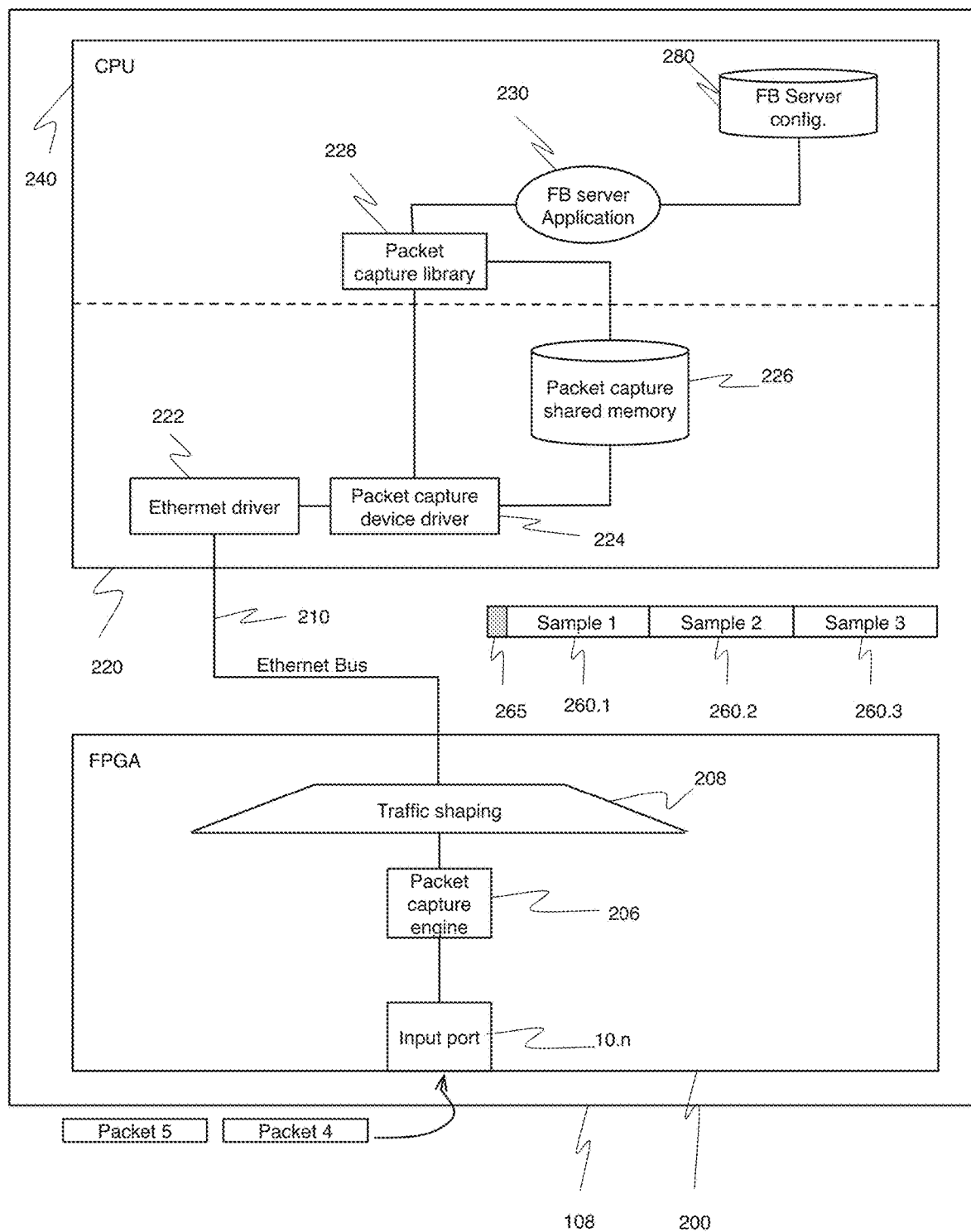
FIG. 2 is an example architecture for the flow server.

FIG. 2 shows an example embodiment of the flow server 120. The flow server mechanism 120 is divided in four main sub-components: the packet capture engine 206, the packet capture device driver 224, the packet capture library 228 and the flow server application (task) 230. The packet capture engine 206 executes in a field programmable gate array (FPGA) 200 or other programmable processor. The packet capture device driver 224 executes in the CPU kernel space 220, whereas the packet capture library 228 and the flow server application 230 execute in the CPU user space 240. Alternatively, the streaming can be done by the FPGA in order to reach higher throughput streaming.

The packet capture engine 206 is responsible for capturing the traffic packets based on defined flow filters. The packet capture engine 206 is also responsible for packaging the captured packets into samples, where a header or meta-data such as that described above is placed before each captured packet. The packet capturing is performed in two steps. First, an FPGA 200 captures traffic packets 206 that match specific flow filters, defined for each port. A flow filter can either operate via layer-2 switching or layer-3 switching protocols, for example. Flow filtering can be performed using any mechanism known in the art. The second step is the transfer of those samples (captured packets and meta-data) from the FPGA 200 to a CPU 220 using a high speed bus 210 (e.g., Ethernet or Peripheral Component Interconnect Express (PCIe)). This bus 210 may be shared with other communications between the FPGA and the CPU, such as the reading and writing of the FPGA registers and the transfer of specific packets coming from or going to a network interface. The samples 260.1, 260.2, 260.3 are encapsulated by the FPGA 208 with an additional header/meta-data 265.

In order to optimize the transfer of the samples toward the CPU, and to also generate fewer interrupts in the CPU, the samples 260.1, 260.2, 260.3 are aggregated together in a single high speed bus payload. If the high speed bus only supports a limited payload size, the number of samples is limited to the configured maximum size 208 (MTU). This payload is made to have a size equal to or smaller than the high speed bus MTU. Therefore, if inserting a new sample into the payload would make the payload larger than the high speed bus MTU, then the payload is first sent, and the new sample is put in a new payload, which is sent later. Generically, the samples can be aggregated and transferred in burst to the CPU via the high speed bus.

The FPGA adds a header 265 to the aggregated samples 260.1 . . . 260.3 for the transfer of each payload from the FPGA to the CPU in order to detect whether the payload contains samples and whether any payload has been lost. The header/meta-data information added to the samples reduces the load on the CPU when copying the payload into the TCP stream. Since the sample formatting is performed at the FPGA level, the CPU doesn't have to process every single captured packet in order to copy its data into another buffer and then add the header. The header 265 as well as the sample formats can be specified to match the granularity of the CPU native transfers hence optimizing transfers within the CPU. Note that this header must not be confused with the header added by the TCP session.

The packet capture device driver 224 receives the samples from the FPGA, via a high speed bus driver 222. The received samples are stored 224 as-is in a shared memory 226, which is accessible by the streaming mechanism. The purpose of this memory 226 is to allow the FPGA to send the captured packets to the CPU as fast as possible, while the CPU's objective is to store those samples until the streaming mechanism is ready to send them to the flow client 130. In order to avoid the FPGA from flooding the CPU when the captured packets are coming at a higher rate than the streaming mechanism can support, and also to avoid overflowing the shared memory, a queuing and shaping mechanism 208 is used in the FPGA 200. The packet capture device driver 224 calculates, at predetermined intervals (e.g., every 1000 msec), the shaping rate of the FPGA based on the space left in the shared memory. For example, if the shared memory usage is less than 50%, then the shaper rate may be set to its maximum value or empty level. If the shared memory usage is higher than 50% and lower than 75%, then the shaper rate may be set to its middle value or middle level. If the shared memory usage is higher than 75% and lower than 95%, then the shaper rate may be set to its minimum value or low level. When the shared memory usage is higher than 95%, then the shaper rate may be set to zero or full level. The packet capture device driver 224 may configure the shaping rate via a register in the FPGA or via another configuration mechanism.

The packet capture library 228 is used by the flow server application 230 in user space 240 and by the packet capture driver 224 in kernel space 220. The packet capture library 228 provides services required to manage the configuration and the behavior of the flow server mechanism 230 as well as to manage the packet capture and shared memory in order to extract the encapsulated samples to stream. Configuration and other parameters are stored in memory 280.

The flow server application 230 receives and accepts a TCP connection request from a flow client. The flow server application 230 is also responsible for configuring and gathering some statistics by sending get/set/activate configuration requests and get status/statistics requests to the packet capture device driver 224 using the packet capture library 228.

In one embodiment, the flow server application 230 executes in user-space only. Finally, the flow server application 230 is responsible for streaming the samples to the connected flow client. This can be done by reading the samples from the shared memory 226 using the packet capture library 228 and putting them in a TCP stream. A process running in user-space reads the samples from the shared memory. Since the samples are already formatted with the proper format, they are simply added as-is to the TCP stream.

In another embodiment, the flow server application 230 initiates the connection with the flow client and manages the statistics in the user-space while it streams the sample towards the flow client in the kernel-space.

By using a shared memory in the CPU, the samples are not copied from kernel-space to user-space, thus avoiding context switches between the kernel and the user-space when the streamer portion of the flow server application 230 runs in the user-space. However, the usage of the shared memory does not reduce the number of bytes copied from the user space to the TCP socket for the streaming of the packets captured.

If there are no packets being captured by the flow server, the FPGA sends periodical payload containing a time-based message to the flow client to make sure the connection is maintained and ready for the next capture.

In another embodiment, one flow server may be configured to send samples to multiple flow clients, either in broadcast mode where each flow client gets a copy or in select mode where the samples are sent to two or more clients based on configuration.

In another embodiment, a flow client may receive samples from multitude flow servers where each flow server has a unique identity and the samples are processed according to their source.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for analysis of data packets at a network device having an input port configured to receive a plurality of packets from a network and an output port configured to transmit the data packets to the network, the method comprising:
    capturing, by a programmable processor, one of said plurality of packets received on the input port matching one or more predetermined criteria;
    creating, by the programmable processor, one or more metadata related to the captured packet;
    sending, from the programmable processor, a sample comprising a copy of said captured packet along with the metadata, to a processor via a high speed bus; and
    streaming, via said programmable processor, the sample to one or more clients.

2. The method of claim 1, wherein said metadata is added in a header to the data packet.

3. The method of claim 1, wherein said matching one or more predetermined criteria is done via a layer-2 filtering protocol.

4. The method of claim 1, wherein said matching one or more predetermined criteria is done via a layer-3 filtering protocol.

5. The method of claim 1, wherein said transmitting is done via an Ethernet bus.

6. A network device comprising:
    an input port configured to receive a plurality of data packets from a network;
    a programmable packet capture processor configured to capture one of said data packet received on the input port matching one or more predetermined criteria and to create one or more metadata related to the captured packet and to send a sample comprising a copy of said captured packet along with the metadata, to a processor of said network device via a high speed bus and to stream the sample to one or more clients.

7. The network device of claim 6, wherein the packet capture processor is configured to capture the packets using a layer-2 filtering protocol.

8. The network device of claim 6, wherein the packet capture processor is configured to capture is configured to filter the packets using a layer-3 filtering protocol.

* * * * *

UNITED STATES PATENT AND TRADEMARK OFFICE
CERTIFICATE OF CORRECTION

PATENT NO. : 11,606,448 B2
APPLICATION NO. : 17/548850
DATED : March 14, 2023
INVENTOR(S) : Sylvain Lizotte et al.

It is certified that error appears in the above-identified patent and that said Letters Patent is hereby corrected as shown below:

In the Claims

Claim 8, Column 6, Lines 53 and 54:
"capture processor is configured to capture is configured to filter the packets"
Should read -- capture processor is configured to filter the packets --

Signed and Sealed this
Eleventh Day of July, 2023

Katherine Kelly Vidal
*Director of the United States Patent and Trademark Office*